(12) United States Patent
Feng

(10) Patent No.: US 12,444,327 B2
(45) Date of Patent: Oct. 14, 2025

(54) FLEXIBLE DISPLAY PANEL AND ELECTRONIC DEVICE

(71) Applicant: Wuhan China Star Optoelectronics Semiconductor Display Technology Co., Ltd., Hubei (CN)

(72) Inventor: Zikang Feng, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/615,164

(22) PCT Filed: Nov. 25, 2021

(86) PCT No.: PCT/CN2021/133291
§ 371 (c)(1),
(2) Date: Sep. 5, 2024

(87) PCT Pub. No.: WO2023/087358
PCT Pub. Date: May 25, 2023

(65) Prior Publication Data
US 2024/0420603 A1 Dec. 19, 2024

(30) Foreign Application Priority Data
Nov. 19, 2021 (CN) .......................... 202111376608.0

(51) Int. Cl.
*G09F 9/30* (2006.01)
*G06F 1/16* (2006.01)
*H04M 1/02* (2006.01)

(52) U.S. Cl.
CPC ............ *G09F 9/301* (2013.01); *G06F 1/1652* (2013.01); *H04M 1/0268* (2013.01)

(58) Field of Classification Search
CPC ...... G09F 9/301; G06F 1/1652; G06F 1/1681; H04M 1/0268
See application file for complete search history.

(56) References Cited

U.S. PATENT DOCUMENTS 10,890,949 B2   1/2021   Ou et al.
2016/0378203 A1  12/2016  Kim et al.
(Continued)

FOREIGN PATENT DOCUMENTS

CN    107395817    11/2017
CN    207022053    2/2018
(Continued)

OTHER PUBLICATIONS

International Search Report and the Written Opinion Dated Jul. 28, 2022 From the International Searching Authority Re. Application No. PCT/CN2021/133291 and Its Translation Into English. (20 Pages).

(Continued)

*Primary Examiner* — James R Greece
*Assistant Examiner* — Jose M Diaz

(57) ABSTRACT

A flexible display panel and an electronic device are provided. The electronic device includes a flexible display panel. The flexible display panel includes a main body of the flexible display panel, a first support part, a second support part, and a hinge. When a flexible part of the main body of the flexible display panel is in a bent state, the first support part and the second support part are both close to or far from a fixing bracket to make a size of the flexible part match a size of the hinge, and to avoid the hinge from squeezing or pulling the main body of the flexible display panel.

20 Claims, 9 Drawing Sheets

(56) References Cited

U.S. PATENT DOCUMENTS

2018/0324964 A1  11/2018  Yoo et al.
2023/0007797 A1* 1/2023  Jiang .................... G06F 1/1681
2023/0340988 A1  10/2023  Wang

FOREIGN PATENT DOCUMENTS

| CN | 209860956 | 12/2019 |
| CN | 112648279 | 4/2021  |
| CN | 113015947 | 6/2021  |
| CN | 113202857 | 8/2021  |
| CN | 113241011 | 8/2021  |
| CN | 216623626 | 5/2022  |

OTHER PUBLICATIONS

Notification of Office Action and Search Report Dated Oct. 18, 2024 From The State Intellectul Property Office of the People's Republic of China Re. Application No. 202111376608.0 and Its Translation Into English. (32 Pages).

* cited by examiner

FLEXIBLE DISPLAY PANEL AND ELECTRONIC DEVICE

CROSS-REFERENCE TO RELATED APPLICATION

This application is a National Phase of PCT Patent Application No. PCT/CN2021/133291 having International filing date of Nov. 25, 2021, which claims the benefit of priority of Chinese Patent Application No. 202111376608.0 filed on Nov. 19, 2021. The contents of the above applications are all incorporated by reference as if fully set forth herein in their entirety.

TECHNICAL FIELD

The present invention relates to a field of display technology, and in particular to a flexible display panel and an electronic device.

BACKGROUND

With continuous development of display technology, in order to meet different usage requirements, various displays with different characteristics have also emerged. The development trend of intelligence, portability, and flexibility is one of main development directions of current electronic devices. Compared with the traditional flat panel display technology, a most prominent advantage of flexible display technology is that it breaks through an inherent concept of an original two-dimensional display and expands application field of the display technology to more portable electronic devices. Users can fold or roll an electronic device with a flexible display panel as needed to reduce a size of the electronic device and improve portability of the electronic device.

SUMMARY

Technical Problem

At present, sizes of a hinge mechanism and a flexible display panel body cannot match each other before and after a foldable electronic device is folded in or out, which causes the hinge mechanism to squeeze or pull the flexible display panel body.

In summary, existing flexible display panels and electronic devices have a problem that sizes of a hinge and a main body of the flexible display panel cannot match each other. Therefore, it is necessary to provide a flexible display panel and an electronic device to improve this defect.

Problem Solution

Technical Solution

The present invention provides a flexible display panel and an electronic device, used to solve the problem that the size of the hinge and the main body of the flexible display panel cannot match each other in the existing flexible display panel and electronic device.

The present invention provides A flexible display panel, comprising:
a main body of the flexible display panel, comprising a flexible part;
a first support part;
a second support part; and
a hinge, comprising:
a fixing bracket;
a first movement mechanism rotatably connected to the fixing bracket along a first axis, the first movement mechanism connected to the first support to drive the first support to move away from or close to the fixing bracket; and
a second movement mechanism rotatably connected to the fixing bracket along a second axis, the second movement mechanism connected to the second support to drive the second support to move away from or close to the fixing bracket;
wherein when the flexible part is in a bending state, the first support and the second support are both away from or close to the fixing bracket.

According to an embodiment of the application, wherein the bending state comprises a first bending state and a second bending state;
wherein when the flexible part is in the first bending state, the first support and the second support are both away from the fixing bracket; when the flexible part is in the second bending state, the first support and the second support are close to the fixing bracket;
a radius of curvature of the flexible part in the first bending state is smaller than a radius of curvature of the flexible part in the second bending state.

According to an embodiment of the application, wherein the first movement mechanism comprises a first transmission mechanism and a first sliding plate, the second movement mechanism comprises a second transmission mechanism and a second sliding plate;
wherein the first transmission mechanism is rotatably connected to the fixing bracket along the first axis, the first transmission mechanism is movably connected to the first sliding plate to drive the first sliding plate away from or close to the fixing bracket, the first sliding plate is fixedly connected to the first support;
the second transmission mechanism is rotatably connected to the fixing bracket along the second axis, the second transmission mechanism is movably connected to the second sliding plate to drive the second sliding plate away from or close to the fixing bracket, and the second sliding plate is fixedly connected to the second support.

According to an embodiment of the application, wherein the hinge further comprises: a first rotating mechanism rotatably connected to the fixing bracket along a third axis;
a second rotating mechanism rotatably connected to the fixing bracket along a fourth axis;
a first supporting plate rotatably connected to the first rotating mechanism along a fifth axis, the first sliding plate slidably mounted on the first supporting plate; and
a second supporting plate rotatably connected to the second rotating mechanism along a sixth axis, and the second sliding plate slidably mounted on the second supporting plate.

According to an embodiment of the application, wherein the first transmission mechanism comprises a first transmission part, a first slider, and a first swing rod; the second transmission mechanism comprises a second transmission part, a second slider, and a second swing rod:
wherein the first transmission part is rotatably connected to the fixing bracket along the first axis, the first transmission part is rotatably connected to one end of the first slider, another end of the first slider is movably connected to the first swing rod, one end of the first swing rod is rotatably connected to the first supporting plate, another end of the first swing rod is movably connected to the first slider;

the second transmission part is rotatably connected to the fixing bracket along the second axis, the second transmission part is rotatably connected to one end of the second slider, another end of the second slider is movably connected to the second swing rod, one end of the second swing rod is rotatably connected to the second supporting plate, and another end of the second swing rod is movably connected to the second slider.

According to an embodiment of the application, wherein the first transmission part comprises a first connecting rod, and the second transmission part comprises a second connecting rod:

wherein one end of the first connecting rod is rotatably connected to the fixing bracket, another end of the first connecting rod is rotatably connected to the first slider;

one end of the second connecting rod is rotatably connected to the fixing bracket, and another end of the second connecting rod is rotatably connected to the second slider.

According to an embodiment of the application, wherein the first supporting plate is provided with a first sliding groove, and the second supporting plate is provided with a second sliding groove;

wherein the first slider is slidably received in the first sliding groove, and the second slider is slidably received in the second sliding groove.

According to an embodiment of the application, wherein the first transmission mechanism further comprises a first fixing member, the second transmission mechanism further comprises a second fixing member; the first swing rod is provided with a third sliding groove, and the second swing rod is provided with a fourth sliding groove; the first fixing member passes through the third sliding groove and is fixedly connected to the first slider, and the second fixing member passes through the fourth sliding groove and is fixedly connected to the second slider.

According to an embodiment of the application, wherein the first transmission mechanism further comprises a third fixing member, the second transmission mechanism further comprises a fourth fixing member; the first sliding plate is provided with a fifth sliding groove, the second sliding plate is provided with a sixth sliding groove; the third fixing member passes through the fifth sliding groove and is fixedly connected to the first swing rod, and the fourth fixing member passes through the sixth sliding groove and is fixedly connected to the second swing rod.

According to an embodiment of the application, wherein the first rotating mechanism comprises a first rotating member, a second rotating member, a third transmission member, and a first linkage fixing member; the second rotating mechanism comprises a third rotating member, a fourth rotating member, a fourth transmission member, and a second linkage fixing member;

wherein the first rotating member is rotatably connected to the fixing bracket along the third axis, the third transmission member is sleeved on the first rotating member, the second rotating member is rotatably connected to the third transmission member along the fifth axis; one end of the first linkage fixing member is sleeved on the second rotating member, and another end of the first linkage fixing member is fixedly connected to the first supporting plate;

the third rotating member is rotatably connected to the fixing bracket along the fourth axis, the fourth transmission member is sleeved on the third rotating member, the fourth rotating member is rotatably connected to the fourth transmission member along the sixth axis; one end of the second linkage fixing member is sleeved on the fourth rotating member, and another end of the second linkage fixing member is fixedly connected to the second supporting plate.

According to an embodiment of the application, wherein the third transmission member has a first gear part, and the fourth transmission member has a second gear part;

wherein the first gear part meshes with the second gear part.

According to an embodiment of the application, wherein the hinge further comprises a fixed block, the first rotating part and the third rotating part are rotatably connected to the fixed block;

wherein opposite sides of the fixed block are provided with racks; the first linkage fixing member has a third gear part, the second linkage fixing member is provided with a fourth gear portion, and the third gear part and the fourth gear part meshes with the racks, respectively.

According to an embodiment of the application, wherein the hinge further comprises a first guide rod connector, a second guide rod connector, a first guide rod, and a second guide rod; the first support plate is provided with a first sliding hole, the second support plate is provided with a second sliding hole;

wherein the first guide rod connector is fixedly connected to the first support; one end of the first guide rod is fixedly connected to the first guide rod connector, another end of the first guide rod can be slidably installed in the first sliding hole;

the second guide rod connector is fixedly connected to the second support; one end of the second guide rod is fixedly connected to the second guide rod connector, and another end of the second guide rod is slidable installed in the second sliding hole.

According to an embodiment of the application, wherein the first supporting member has a plurality of first supporting bars arranged at intervals, the second supporting member has a plurality of second supporting bars arranged at intervals; and the first supporting plate is provided with a plurality of seventh sliding grooves arranged at intervals, the second support plate has a plurality of eighth sliding grooves arranged at intervals;

wherein the first supporting bars are slidably received in the seventh sliding grooves, and the second supporting bars are slidably received in the eighth sliding grooves.

The present invention also provides an electronic device, comprising a flexible display panel, the flexible display panel comprising:

a main body of the flexible display panel, comprising a flexible part;

a first support part;

a second support part; and a hinge, comprising:

a fixing bracket;

a first movement mechanism rotatably connected to the fixing bracket along a first axis, the first movement mechanism connected to the first support to drive the first support to move away from or close to the fixing bracket; and a second movement mechanism rotatably connected to the fixing bracket along a second axis, the second movement mechanism connected to the second support to drive the second support to move away from or close to the fixing bracket;

wherein, when the flexible part is in a bending state, the first support and the second support are both away from or close to the fixing bracket.

According to an embodiment of the application, wherein the bending state comprises a first bending state and a second bending state;
wherein, when the flexible part is in the first bending state, the first support and the second support are both away from the fixing bracket; when the flexible part is in the second bending state, the first support and the second support are close to the fixing bracket;
a radius of curvature of the flexible part in the first bending state is smaller than a radius
of curvature of the flexible part in the second bending state.

According to an embodiment of the application, wherein the first movement mechanism comprises a first transmission mechanism and a first sliding plate, the second movement mechanism comprises a second transmission mechanism and a second sliding plate;
wherein, the first transmission mechanism is rotatably connected to the fixing bracket along the first axis, the first transmission mechanism is movably connected to the first sliding plate to drive the first sliding plate away from or close to the fixing bracket, the first sliding plate is fixedly connected to the first support;
the second transmission mechanism is rotatably connected to the fixing bracket along the second axis, the second transmission mechanism is movably connected to the second sliding plate to drive the second sliding plate away from or close to the fixing bracket, and the second sliding plate is fixedly connected to the second support.

According to an embodiment of the application, wherein the hinge further comprises:
a first rotating mechanism, rotatably connected to the fixing bracket along a third axis;
a second rotating mechanism, rotatably connected to the fixing bracket along a fourth axis;
a first supporting plate, rotatably connected to the first rotating mechanism along a fifth axis, the first sliding plate slidably mounted on the first supporting plate; and
a second supporting plate, rotatably connected to the second rotating mechanism along a sixth axis, and the second sliding plate slidably mounted on the second supporting plate.

According to an embodiment of the application, wherein the first transmission mechanism comprises a first transmission part, a first slider, and a first swing rod; the second transmission mechanism comprises a second transmission part, a second slider and a second swing rod;
wherein, the first transmission part is rotatably connected to the fixing bracket along the first axis, the first transmission part is rotatably connected to one end of the first slider, another end of the first slider is movably connected to the first swing rod, one end of the first swing rod is rotatably connected to the first supporting plate, another end of the first swing rod is movably connected to the first slider;
the second transmission part is rotatably connected to the fixing bracket along the second axis, the second transmission part is rotatably connected to one end of the second slider, another end of the second slider is movably connected to the second swing rod, one end of the second swing rod is rotatably connected to the second supporting plate, and another end of the second swing rod is movably connected to the second slider.

According to an embodiment of the application, wherein the first transmission part comprises a first connecting rod, and the second transmission part comprises a second connecting rod:
wherein, one end of the first connecting rod is rotatably connected to the fixing bracket, another end of the first connecting rod is rotatably connected to the first slider;
one end of the second connecting rod is rotatably connected to the fixing bracket, and another end of the second connecting rod is rotatably connected to the second slider.

Beneficial Effects of Invention

Beneficial Effects

The beneficial effects of the embodiments of the present disclosure: the embodiments of the present application provide a flexible display panel and an electronic device, the electronic device comprising the flexible display panel, the flexible display panel comprises a main body of the flexible display panel, a first support part, a second support part and a hinge, the main body of the flexible display panel comprises a flexible part, the hinge comprises fixing bracket, a first movement mechanism and a second movement mechanism, the first movement mechanism is rotatably connected to the fixing bracket along a first axis, the first movement mechanism is fixed connected to the first support part to drive the first support to move away from or close to the fixing bracket, the second movement mechanism is rotatably connected to the fixing bracket along a second axis, the second movement mechanism is fixed connected to the second support part to drive the second support to move away from or close to the fixing bracket, when the flexible part is in a bending state, the first support and the second support are both away from or close to the fixing bracket, in this way, the size of the flexible part is matched with the size of the hinge, thereby avoiding the hinge from squeezing or pulling the main body of the flexible display panel.

BRIEF DESCRIPTION OF DRAWINGS

In order to explain the embodiments or the technical solutions in the prior art more clearly, the following will briefly introduce the drawings that need to be used in the description of the embodiments or the prior art. Obviously, the drawings in the following description are only for disclosure, for those of ordinary skill in the art, without creative work, other drawings can be obtained from these drawings.

DETAILED DESCRIPTION

Implementation of the Present Invention

Figure 1:
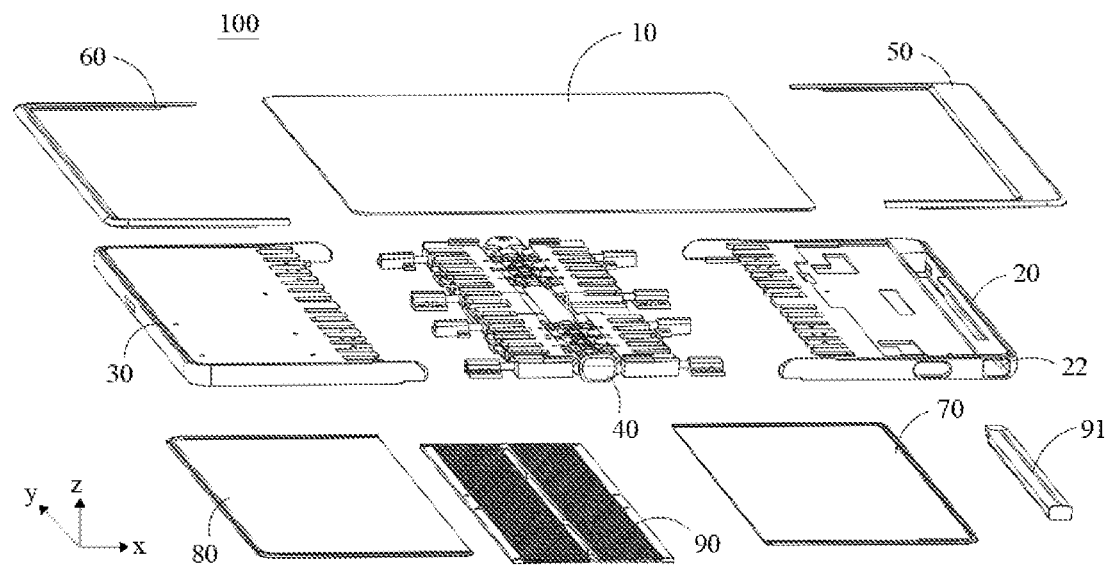
FIG. 1 is a decomposition schematic diagram of a flexible display panel.

The description of the following embodiments refers to the attached drawings to illustrate specific embodiments that the present disclosure can be implemented. Directional terms mentioned in this disclosure, such as [top], [bottom], [front], [rear], [left], [right], [inside], [outside], [side], etc., are only refer to the direction of the attached drawings. Therefore, the directional terms used are used to illustrate and understand the present disclosure, rather than to limit the present disclosure. In the figure, the units with similar structure are indicated by the same reference numerals.

The disclosure will be further described below in conjunction with the drawings and specific embodiments:

The embodiments of the present application provide a flexible display panel and an electronic device, the electronic device comprises a flexible display panel. In the embodiment of this application, the electronic device can be a mobile terminal, such as a smart phone, a tablet computer, a notebook computer, etc., the electronic device can also be wearable terminals, such as smart watches, smart bracelets, smart glasses, augmented reality devices, etc., the electronic device can also be a fixed terminal, such as a desktop computer, a TV, etc.

As shown in FIG. 1, FIG. 1 is a decomposition schematic diagram of a flexible display panel, the flexible display panel 100 comprises a main body portion of the flexible display panel 10, a first support part 20, a second support part 30, a first front frame 50, a second front frame 60, a first back shell 70, a second back shell 80.

Figure 2:
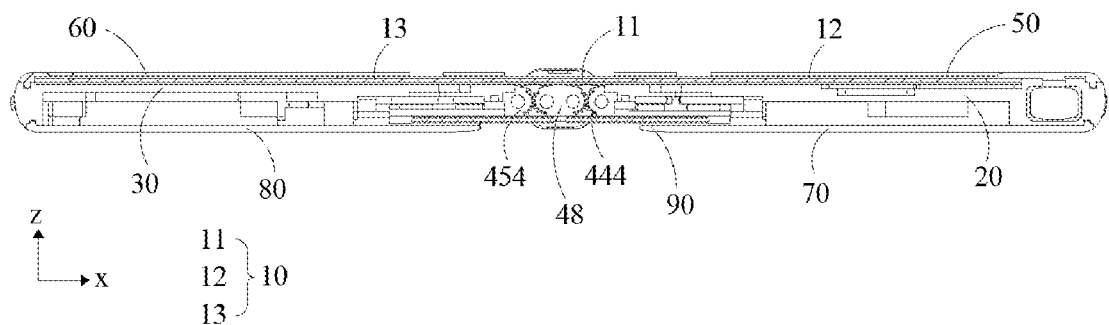
FIG. 2 is a schematic cross-sectional view in a flattened state of the flexible display panel provided by the embodiment of the present application.

As shown in FIG. 2, FIG. 2 is a schematic cross-sectional view in a flattened state of the flexible display panel provided by the embodiment of the present application, the main body portion of the flexible display panel 10 comprises a flexible part 11 and the first part 12 and the second part 13 connected to opposite ends of the flexible part 11, the flexible part 11 is a part that can be folded of the main body portion of the flexible display panel 10.

In the embodiment of this application, the first support part 20 and the second support part 30 may be a first middle frame and a second middle frame of the flexible display panel, respectively, the first middle frame and the second middle frame can be configured as to carry the main body portion of the flexible display panel 10. The first back shell 70 is disposed on a side of the first support part 20 away from the main body portion of the flexible display panel 10, the second back shell 80 is disposed on a side of the second support part 30 away from the main body portion of the flexible display panel 10. Both the first support part 20 and the second support part 30 can have separate accommodating spaces, or the first support part 20 and the second support part 30 can form an accommodating space with the first rear shell 70 and the second rear shell 80, respectively, the accommodating space can accommodate electronic components in the electronic device that are necessary for driving flexible display panel 100 such as motherboards, printed circuit boards, and batteries.

In practical applications, the first support part 20 and the first middle frame can be two independent parts, the first support part 20 can be a support plate, the first support part 20 can be fixedly connected to the first middle frame through threaded connection, snap-fitting, etc, or it can be slidably connected to the first middle frame, so that the first middle frame can close to or move away from a fixing bracket with the first support part 20 driven by a first movement mechanism. The second support part 30 and the second middle frame can be two independent amount parts, the second support part 30 can also be a support plate, the second support part 30 can be fixedly connected to the second middle frame through threaded connection, snap-fitting, etc, or it can be slidably connected to the second middle frame, so that the second middle frame can be close to or move away from the fixing bracket with the second support part 30 driven by a second movement mechanism.

A first part 12 can be disposed on at least part of a front side of the first support part 20, the first front frame 50 can be disposed on the front side of the first support part 20 and cover an outer edge of the first part 12. A second part 13 can be disposed on at least part of a front side of the second support part 30, the second front frame 60 can be disposed on the front side of the second support part 30, and cover an outer edge of the second part 13.

It should be noted that, the flexible display panel 100 may have at least one rotation axis for folding the flexible display panel 100, in the following context, a first direction x represents a direction perpendicular to the axis of rotation, a second direction y represents a direction parallel to the axis of rotation, and a third direction z represents a direction perpendicular to a plane of the first direction x and the second direction y, a display surface of the flexible display panel 100 in a flat state may be defined by the first direction x and the second direction y.

Figure 3:
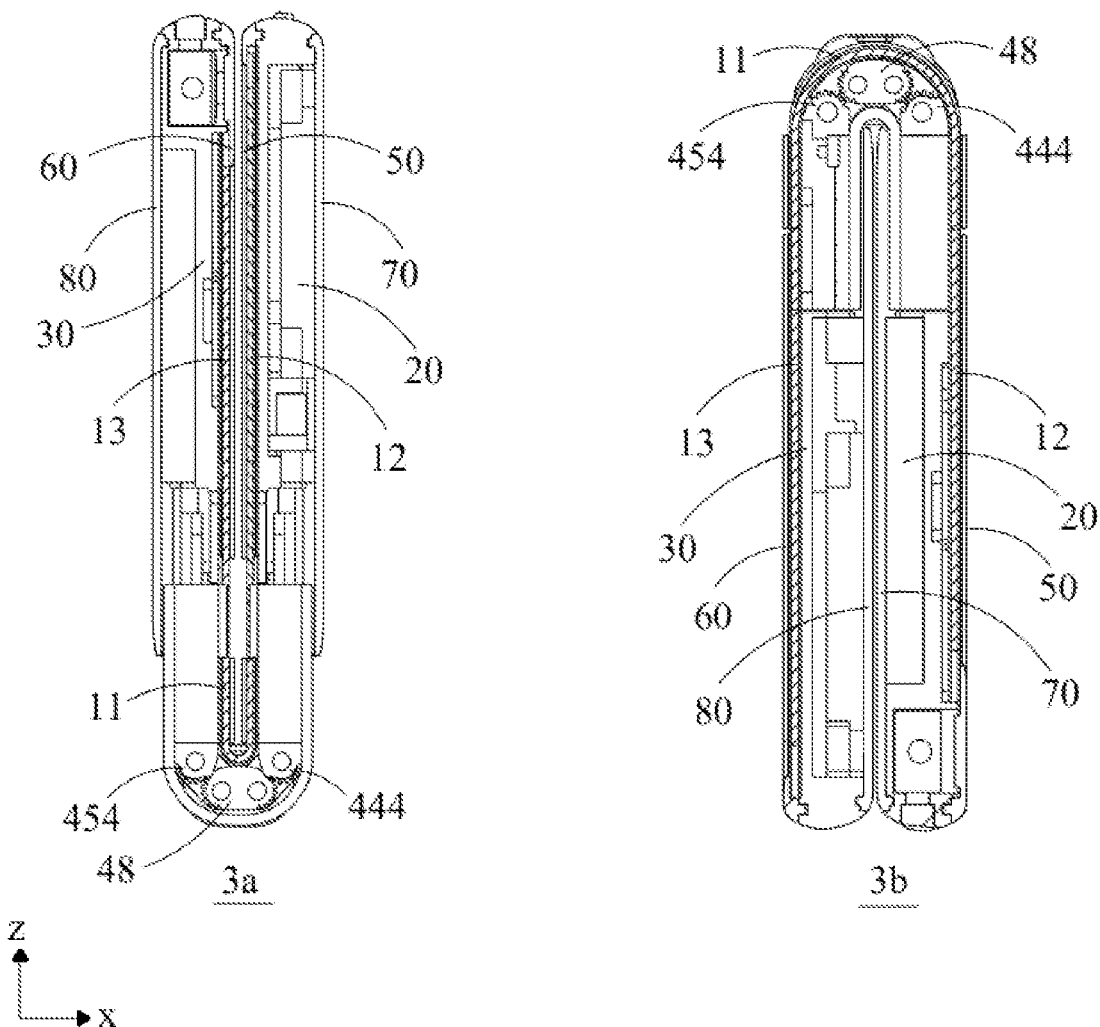
FIG. 3 is a schematic cross-sectional view in a first bending state and a second bending state of the flexible display panel provided by the embodiment of the present application.
Figure 4:
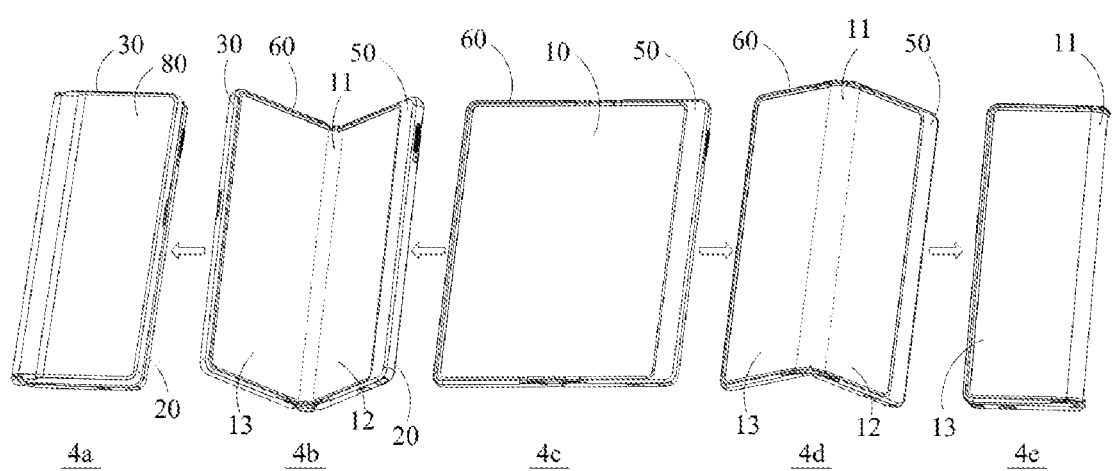
FIG. 4 is a schematic diagram of various forms of a flexible display panel provided by the embodiment of the present application.

As shown in FIG. 2 to FIG. 4 in combination, FIG. 3 is a schematic cross-sectional view in a first bending state and a second bending state of the flexible display panel provided by the embodiment of the present application, FIG. 4 is a schematic diagram of various forms of a flexible display panel provided by the embodiment of the present application.

As shown in FIGS. 2 and 4c in FIG. 4, in this article, the flat state can refer to a state where the flexible display panel and the electronic device are fully unfolded, an angle of about 180 degrees is formed between the front sides of the first support part 20 and second support part 30, so that at least a part of the first part 12 and the second part 13 of the main body portion of the flexible display panel 10 can be in a same plane as the flexible part 11, and the flexible part 11 is in the flat state at this time.

In practical applications, a mode of the flexible display panel in a flattened state can be used as a tablet mode of the electronic device to maximize a display area of the electronic device.

3a in FIGS. 3 and 4a in FIG. 4 are schematic diagrams of the flexible display panel in a first fully folded state. In this article, the first fully folded state may refer to a state where the flexible display panel and the electronic device are completely folded inward and an angle of about 0 degrees is formed between the front sides of the first support part 20 and the second support part 30, so that the first part 12 and the second part 13 of the main body portion of the flexible display panel 10 can face each other.

In practical applications, a mode of the first fully folded state can be used as a portable mode of the electronic device, and the main body portion of the flexible display panel 10 can be surrounded by the first support part 20, the second support part 30, and other structures, so as to prevent the main body portion of the flexible display panel 10 from being damaged.

4b in FIG. 4 is a schematic diagram of the flexible display panel in a first transitional folding state. In this article, the first transitional folding state may refer to a state in which the flexible display panel and the electronic device are between the first fully folded state and the flattened state. When the flexible display panel and the electronic device are in the first fully folded state or the first transitional folding state, the flexible part 11 is in the first bending state.

3b in FIGS. 3 and 4c in FIG. 4 are schematic diagrams of the flexible display panel in a second fully folded state. In this article, the second fully folded state may refer to a state where the flexible display panel and the electronic device are completely folded outward and the front sides of the first support part 20 and the second support part 30 form an angle of about 360 degrees, so that the one part 12 and the second part 13 of the main body portion of the flexible display panel 10 is may face away from each other, and the first back shell 70 and the second back shell 80 may face each other.

In practical applications, the second fully folded state can be used as a mobile phone mode of the electronic device, and either the first part 12 or the second part 13 can be used for screen display, thereby improving convenience of using and holding the flexible display panel and the electronic device.

4d in FIG. 4 is a schematic diagram of the flexible display panel in a second transitional folding state. In this article, the second transitional folding state may refer to a state in which the flexible display panel and the electronic device are between the second fully folded state and a flattened state. When the flexible display panel and the electronic device are in the second fully folded state or the second transitional folding state, the flexible part 11 is in the second bending state.

Figure 5:
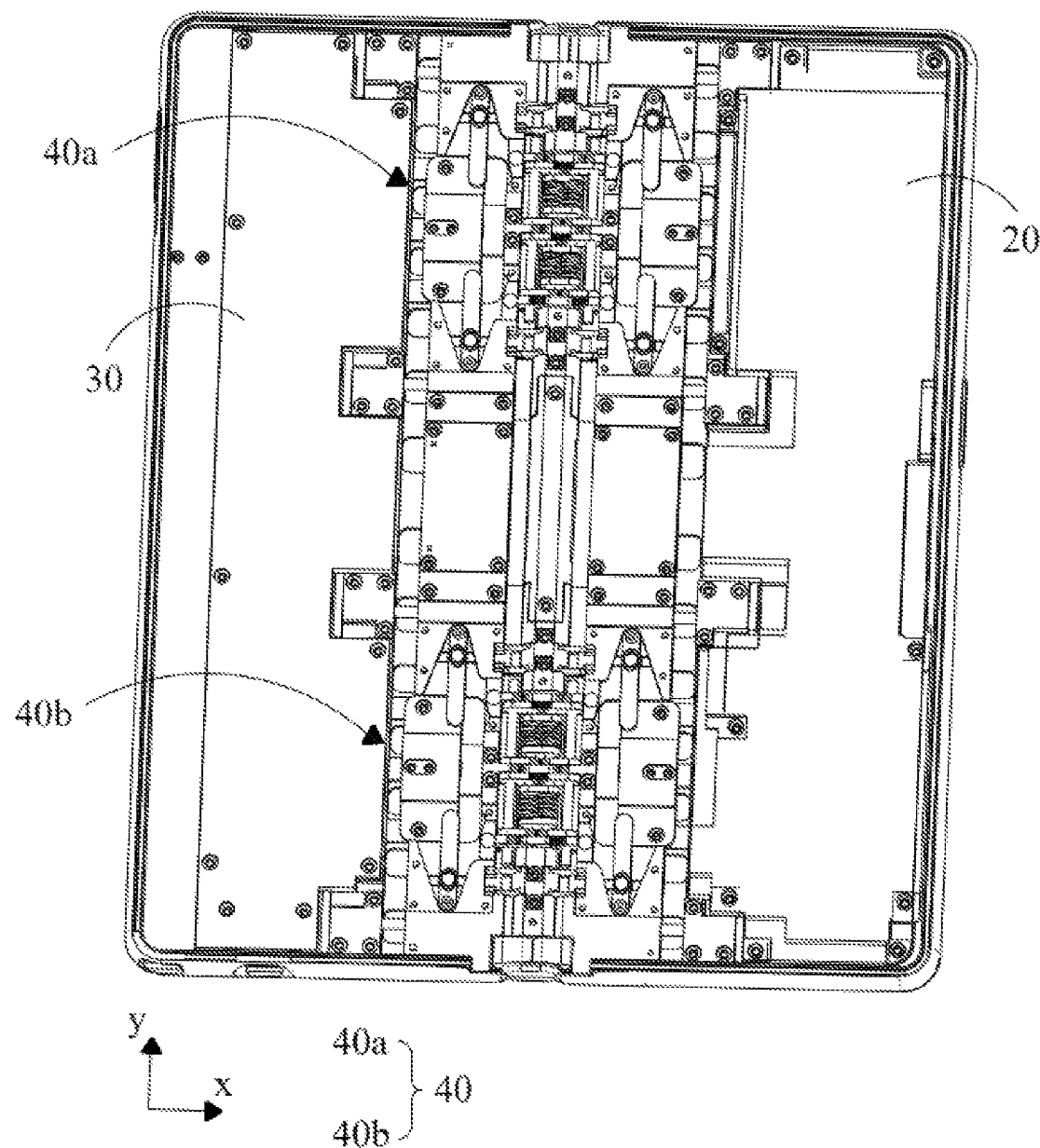
FIG. 5 is a schematic diagram of an internal structure of a back of a flexible display panel provided by the embodiment of the present application.

As shown in FIG. 5, FIG. 5 is a schematic diagram of an internal structure of a back of a flexible display panel provided by the embodiment of the present application of the present application, the flexible display panel 100 further comprises a hinge 40, the hinge 40 comprises a first hinge 40a and a second hinge 40b, an opposite side of the first hinge 40a and an opposite side of the second hinge 40b are both connected to the first support part 20 and the second support part 30. The first hinge 40a and the second hinge 40b can be configured to rotate the first support part 20 and the second support part 30 around two rotation axes parallel to the second direction y and spaced apart in the first direction x.

In the embodiment of this application, structures of the first hinge 40a and the second hinge 40b are same, and a movement process is also same, therefore, only the structure of the first hinge 40a is used as an example for description in the following context and the accompanying drawings of the specification, the structure of the second hinge 40b can refer to the structure of the first hinge 40a, which will not be repeated here. In practical applications, the structures of the first hinge 40a and the second hinge 40b can also be different, and there is no limitation here.

Figure 6:
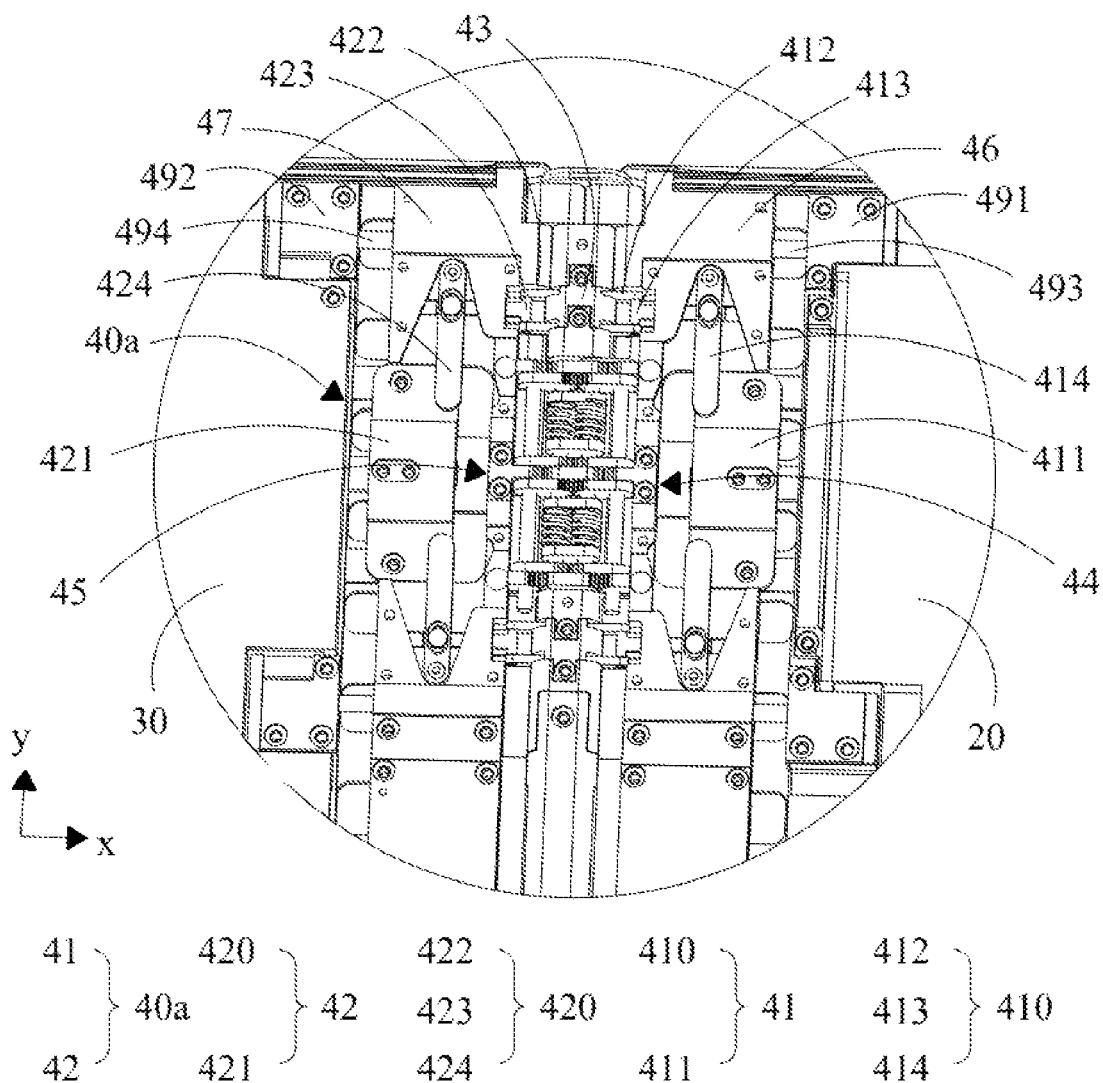
FIG. 6 is a schematic diagram of a back structure in a flattened state of a hinge provided by the embodiment of the present application.

As shown in FIG. 6, FIG. 6 is a schematic diagram of a back structure in a flattened state of a hinge provided by the embodiment of the present application, both the first hinge 40a and the second hinge 40b comprise the fixing bracket 43, the first movement mechanism 41, and the second movement mechanism 42.

One end of the first movement mechanism 41 is rotatably connected to the fixing bracket 43, another end of the first movement mechanism 41 is connected to the first support part 20. One end of the second movement mechanism 42 is rotatably connected to the fixing bracket 43, another end of the second movement mechanism 42 is connected to the second support part 30.

Furthermore, the first movement mechanism 41 comprises a first transmission mechanism 410 and a first sliding plate 411, the second movement mechanism 42 comprises a second transmission mechanism 420 and a second sliding plate 421.

One end of the first transmission mechanism 410 is rotatably connected to the fixing bracket 43, another end of the first transmission mechanism 410 is movably connected to the first sliding plate 411, the first sliding plate 411 fixedly connected to the first support part 20. The first transmission mechanism 410 can be configured to convert rotational movement of the hinge into a linear movement of the first sliding plate 411 perpendicular to the second direction y, and while the first sliding plate 411 moves along a line perpendicular to the second direction y, it also can drive the first support part 20 to move in a same direction.

One end of the second transmission mechanism 420 is rotatably connected to the fixing bracket 43, another end of the second transmission mechanism 420 is movably connected to the second sliding plate 421, the second sliding plate 421 fixedly connected to the second support part 30. The second transmission mechanism 420 can be configured to convert the rotational movement of the hinge into a linear movement of the second sliding plate 421 perpendicular to the second direction y, and while the second sliding plate 421 moves along a line perpendicular to the second direction y, it also can drive the second support part 30 to move in a same direction.

In the embodiment of this application, the first support part 20 and the second support part 30 are both provided with threaded holes, and the first sliding plate 411 and the second sliding plate 421 are both provided with countersunk holes. The first sliding plate 411 can be fixedly connected to the first support part 20 through a threaded connection, the second sliding plate 421 can be fixedly connected to the second support part 30 through a threaded connection.

In one embodiment, the first sliding plate 411 can also be integrally formed with the first support part 20, the second sliding plate 421 can also be integrally formed with the second support part 30.

In one embodiment, the first movement mechanism 41 can only comprises first transmission mechanism 410, one end of the first transmission mechanism 410 is rotatably connected to the fixing bracket 43, another end of the first transmission mechanism 410 is movably connected to the first support part 20, the first movement mechanism 41 can be configured to convert the rotational movement of the hinge into a linear movement of the first support part 20 perpendicular to the second direction y.

The second movement mechanism 42 can only comprise the second transmission mechanism 420, one end of the second transmission mechanism 420 is rotatably connected to the fixing bracket 43, another end of the second transmission mechanism 420 is movably connected to the first support part 20, the first movement mechanism 41 can be configured to convert the rotational movement of the hinge into a linear movement of the first support part 20 perpendicular to the second direction y.

Furthermore, both the first hinge 40a and the second hinge 40b comprise a first rotating mechanism 44, a second rotating mechanism 45, a first supporting plate 46, and a second supporting plate 47. The first rotating mechanism 44 is rotatably connected to the fixing bracket 43, the second rotating mechanism 45 is rotatably connected to the fixing bracket 43.

The first supporting plate 46 is rotatably connected to the first rotating mechanism 44, the first sliding plate 411 is slidably mounted on the first supporting plate 46. The second supporting plate 47 is rotatably connected to the second rotating mechanism 45, the second sliding plate 421 is slidably mounted on the second supporting plate 47.

Both the first supporting plate 46 and the second supporting plate 47 are equipped with slide rails, both the first sliding plate 411 and the second sliding plate 421 are provided with grooves, the groove of the first sliding plate 411 is slidably mounted on the sliding rail of the first supporting plate 46, so that the first sliding plate 411 can slide relative to the first supporting plate 46 in a direction perpendicular to the second direction y. The groove of the second sliding plate 421 is slidably mounted on the sliding rail of the second supporting plate 47, so that the second sliding plate 421 can slide relative to the second supporting plate 47 in a direction perpendicular to the second direction y.

Figure 7:
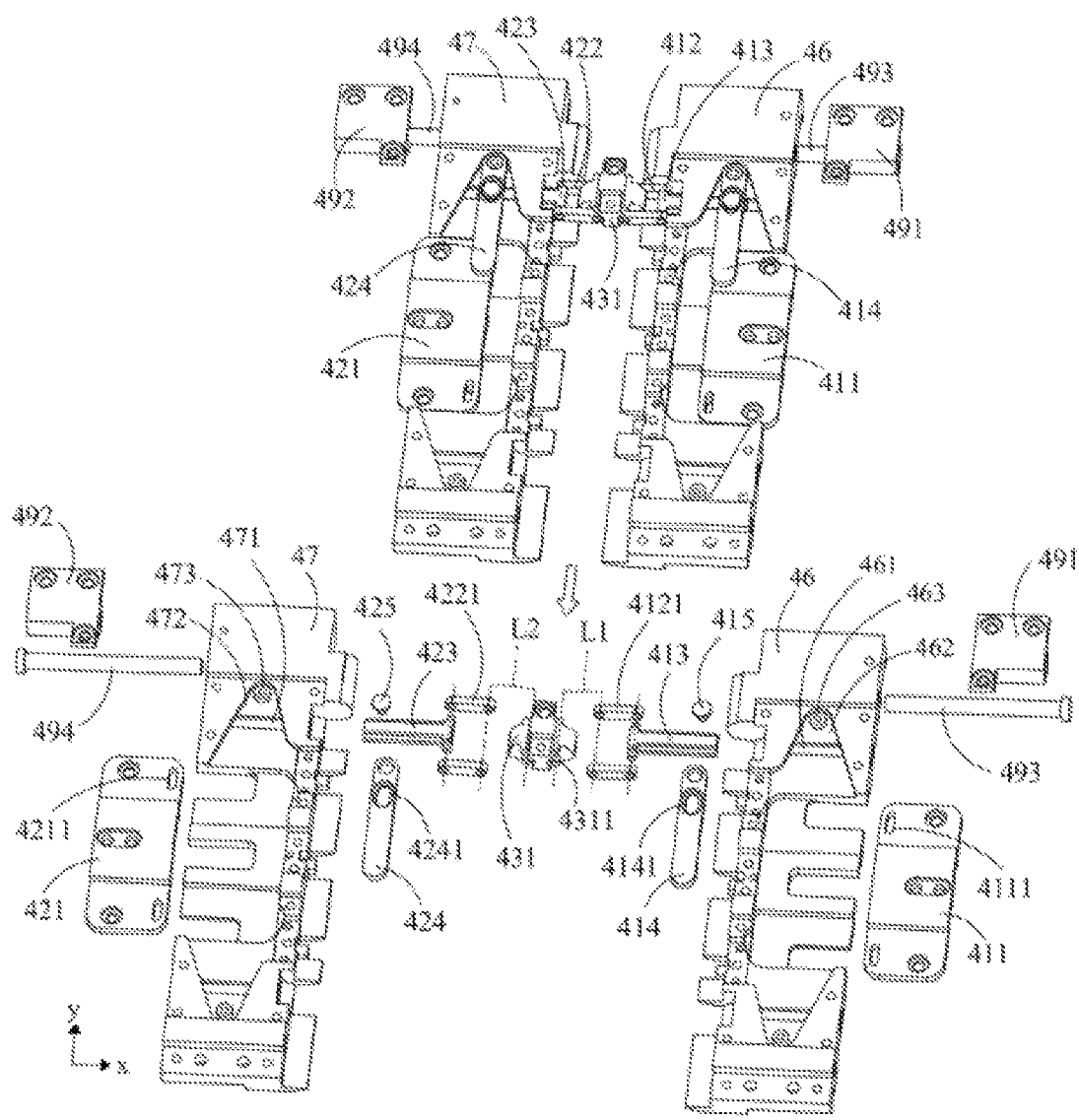
FIG. 7 is an exploded schematic diagram of the hinge provided by the embodiment of the application.

Furthermore, as shown in FIG. 6 and FIG. 7, FIG. 7 is an exploded schematic diagram of the hinge provided by the embodiment of the application, the first transmission mechanism 410 comprises a first transmission part 412, a first slider 413, and a first swing rod 414, the second transmission mechanism 420 comprises a second transmission part 422, a second slider 423, and a second swing rod 424. The fixing bracket 43 comprises a first fixing bracket 431.

One end of the first transmission part 412 is rotatably connected to the first fixing bracket 431, another end of the first transmission part 412 is rotatably connected to one end of the first slider 413, another end of the first slider 413 is movably connected to the first swing rod 414, one end of the first swing rod 414 is rotatably connected to the first supporting plate 46, another end of the first swing rod 414 is movably connected to the first sliding plate 411.

One end of the second transmission part 422 is rotatably connected to the first fixing bracket 431, another end of the second transmission part 422 is rotatably connected to one end of the second slider 423, another end of the second slider 423 is movably connected to the second swing rod 424, one end of the second swing rod 424 is rotatably connected to the second supporting plate 47, another end of the second swing rod 424 is movably connected to the second sliding plate 421.

In the embodiment of the present application, the first transmission part 412 comprises two first connecting rods 4121, the two first connecting rod 4121 are disposed on opposite side of the first fixing bracket 431, the first ends of the two first connecting rod 4121 are rotatably connected to the first fixing bracket 431 along a first axis L1, the second ends of the two first connecting rod 4121 can be rotatably connected to the first slider 413.

The opposite sides of the opposite ends of the first fixing bracket 431 are provided with positioning posts 4311, the opposite ends of the two first connecting rods 4121 are provided with shaft holes, the two positioning posts 4311 at one end of the first fixing bracket 431 pass through the shaft holes at the first ends of the two first connecting rods 4121 respectively, first connecting rod 4121 can rotate relative to the positioning posts 4311.

The opposite side of the first end of the first slider 413 is also provided with positioning posts protruding from a body portion of the first slider 413, the positioning posts can pass through the shaft hole at the second end of the first connecting rod 4121, the first connecting rod 4121 can rotate relative to the positioning posts. In practical applications, a shaft hole can also be provided at the first end of the first slider 413, a pin shaft can be used to pass through the shaft holes at the first end of the first slider 413 and the second end of the first connecting rod 4121 so that the second end of the first connecting rod 4121 can rotatably connected to the first slider 413.

In the embodiment of the present application, the second transmission part 422 comprises two second connecting rod 4221, the two second connecting rod 4221 are disposed on an opposite side of another end of the first fixing bracket 431, first ends of the two second connecting rod 4221 are rotatably connected to the first fixing bracket 431 along a second axis L2, second ends of the two second connecting rod 4221 can be rotatably connected to the second slider 423, the first axis L1 and the second axis L2 are both parallel to the second direction y and are arranged at intervals in the first direction x.

Opposite ends of the two second connecting rod 4221 are provided with shaft holes, the two positioning posts 4311 at another end of the first fixing bracket 431 pass through the shaft holes at the first ends of the two second connecting rod 4221 respectively, the second connecting rod 4221 can rotate relative to the positioning posts 4311.

In the embodiment of the present application, an opposite side of the first end of the second slider 423 is also provided with positioning posts protruding from a body portion of the second slider 423, the positioning posts can pass through the shaft hole at the second end of the second connecting rod 4221, the second connecting rod 4221 can be rotated relative to the positioning posts. In practical applications, a shaft hole can also be provided at the first end of the second slider 423, the pin shaft can be used to pass through the shaft holes at the first end of the second slider 423 and the second end of the second connecting rod 4221 so that the second end of the second connecting rod 4221 can rotatably connected to the second slider 423.

Furthermore, the first supporting plate 46 is provided with a first sliding groove 461, the second supporting plate 47 is provided with a second sliding groove 471, the first slider 413 is slidably received in the first sliding groove 461, the second slider 423 is slidably received in the second sliding groove 471.

In the embodiment of the present application, the first slider 413 and the second slider 423 are both elongated sliders, a length direction of the first sliding groove 461 and the second sliding groove 471 is perpendicular to the second direction y, so that both the first slider 413 and the second slider 423 can slide in a direction perpendicular to the second direction y.

In the embodiment of the present application, a first limiting groove 462 is defined on the first supporting plate 46. A first positioning protrusion 463 is provided in the first limiting groove 462, a shaft hole is defined at a first end of the first swing rod 414, the first positioning protrusion 463 passes through the shaft hole on the first end of the first swing rod 414. The first limiting groove 462 is a fan-shaped groove, the first swing rod 414 can swing circumferentially around the first positioning protrusion 463 within an angle range defined by the first limiting groove 462.

In the embodiment of the present application, a second limiting groove 472 is defined on the second supporting plate 47. A second positioning protrusion 473 is provided in the second limiting groove 472, a shaft hole is defined at a first end of the second swing rod 424, the second positioning protrusion 473 passes through the shaft hole on the first end of the second swing rod 424. The second limiting groove 472 is also a fan-shaped groove, the second swing rod 424 can swing circumferentially around the second positioning protrusion 473 within an angle range defined by the second limiting groove 472.

Furthermore, the first transmission mechanism 410 further comprises a first fixing member 415, the second transmission mechanism 420 further comprises a second fixing member 425. A main body portion of the first swing rod 414 is provided with a third sliding groove 4141 that penetrates the first swing rod 414 in its thickness direction, the main body portion of the second swing rod 424 provided with a fourth sliding groove 4241 that penetrates the second swing rod 424 in its thickness direction.

The first fixing member 415 passes through the third sliding groove 4141 and is fixedly connected to the second end of the first slider 413, the first fixing member 415 can slide and rotate in the third sliding groove 4141. The second fixing member 425 passes through the fourth sliding groove 4241 and is fixedly connected to a second end of the second slider 423, the second fixing member 425 can slide and rotate in the fourth sliding groove 4241.

In the embodiment of the present application, the first fixing member 415 and second fixing member 425 are both pins, both the first slider 413 and the second slider 423 are provided with pin holes at the second end, so that the first fixing member 415 can be fixedly connected with the first slider 413, and the linear sliding of the first slider 413 is converted into the circular swing of the first swing rod 414 through the first fixing member 415, and the second fixing member 425 can also be fixed connected with the second slider 423, and the linear sliding of the second slider 423 is converted into the circular swing of the second swing rod 424 through the second fixing member 425.

The first transmission mechanism 410 further comprises a third fixing member, the second transmission mechanism 420 further comprises a fourth fixing member. Opposite ends of the first sliding plate 411 are provided with a fifth sliding groove 4111 that penetrates the first sliding plate 411 in its thickness direction, opposite ends of the second sliding plate 421 are provided with a sixth sliding groove 4211 that penetrates the second sliding plate 421 in its thickness direction.

The third fixing member penetrates the fifth sliding groove 4111 and is fixedly connected to the second end of the first swing rod 414, the third fixing member can slide and rotate in the fifth sliding groove 4111, thereby using the third fixing member to convert the circular swing of the first swing rod 414 into the linear movement of the first sliding plate 411 perpendicular to the second direction y. The fourth fixing member passes through the sixth sliding groove 4211 and is fixedly connected to the second end of the second swing rod 424, the fourth fixing member can slide and rotate in the sixth sliding groove 4211, thereby using the fourth fixing member to convert the circular swing of the second swing rod 424 into a linear motion of the second sliding plate 421 perpendicular to the second direction y.

In the embodiment of the present application, the third fixing member can be integrally formed with the first swing rod 414, the fourth fixing member can be integrally formed with the second swing rod 424. In practical applications, both the third fixing member and the fourth fixing member can be pins, which are fixedly connected to the first swing rod 414 and the second swing rod 424 through the pin holes provided on the first swing rod 414 and the second swing rod 424, respectively.

In one embodiment, if the first movement mechanism 41 can only comprise the first transmission mechanism 410 and not comprise the first sliding plate 411, the fifth sliding groove 4111 can be defined on the first support part 20, one end of the third fixing member can be fixed connected to the second end of the first swing rod 414, another end of the third fixing member can be slidably installed in the fifth sliding groove 4111.

If the second movement mechanism 42 can only comprise the second transmission mechanism 420 and not comprise the second sliding plate 421, the sixth sliding groove 4211 can be defined on the second support part 30, one end of the fourth fixing member can be fixed connected to the second end of the f second swing rod 424, another end of the fourth fixing member can be slidably installed in the sixth sliding groove 4211.

Figure 9:
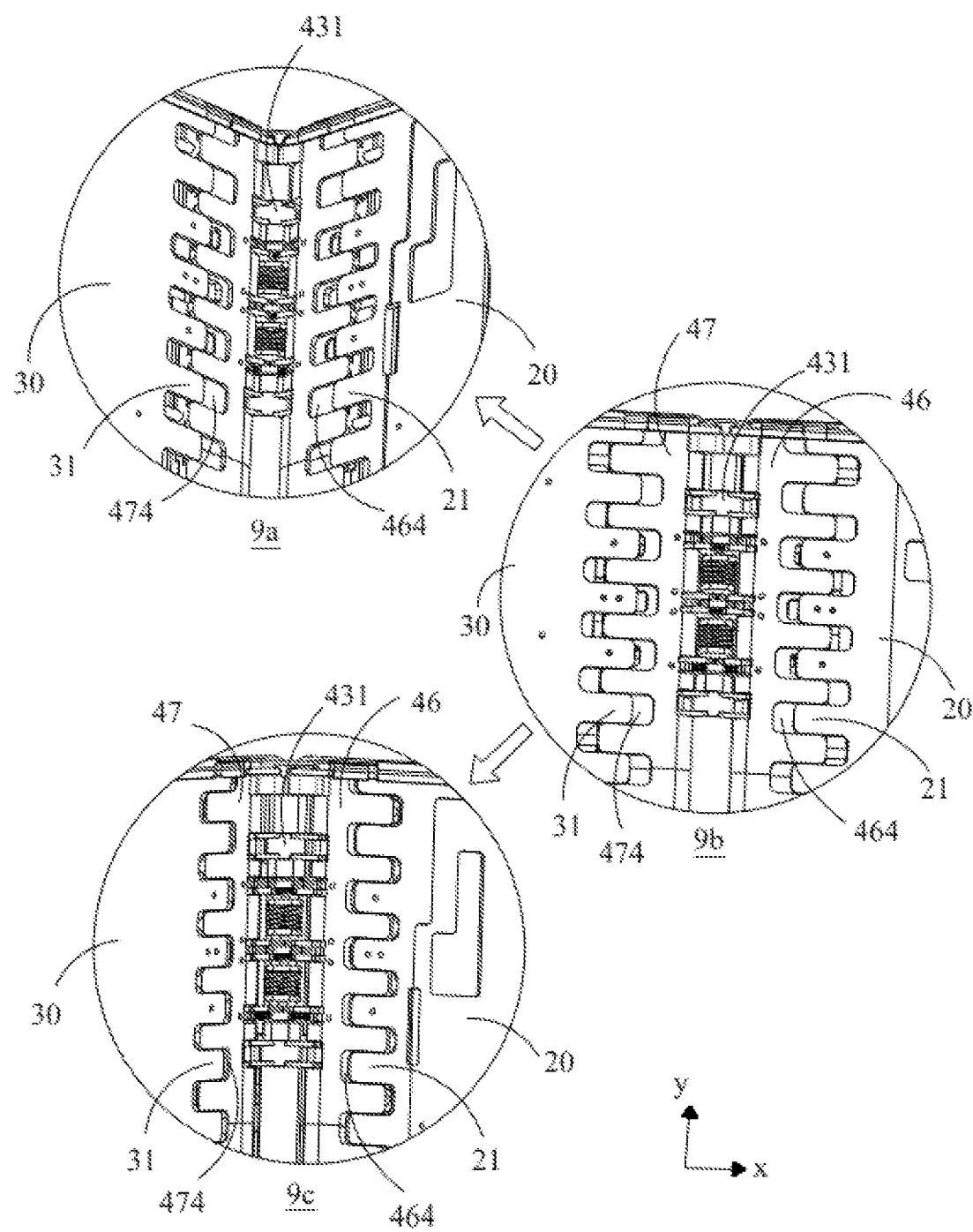
FIG. 9 is a schematic diagram of a folding process inside a front of the flexible display panel provided by the embodiments of the present application.

Furthermore, as shown in FIG. 9, FIG. 9 is a schematic diagram of a folding process inside a front of the flexible display panel provided by the embodiments of the present application, the first support part 20 has a plurality of first support bars 21 arranged at intervals, the second support part 30 has a plurality of second supporting bars 31 arranged at intervals, the first supporting plate 46 has a plurality of seventh sliding grooves 464 arranged at intervals, the second supporting plate 47 has a plurality of eighth sliding grooves 474 arranged at intervals. The first supporting bars 21 are slidably received in the seventh sliding grooves 464, and can linearly slide in the seventh sliding grooves 464 in the direction perpendicular to the second direction y, the second supporting bars 31 are slidably received in the eighth sliding grooves 474, and can linearly slide in the eighth sliding grooves 474 in a direction perpendicular to the second direction y.

Figure 8:
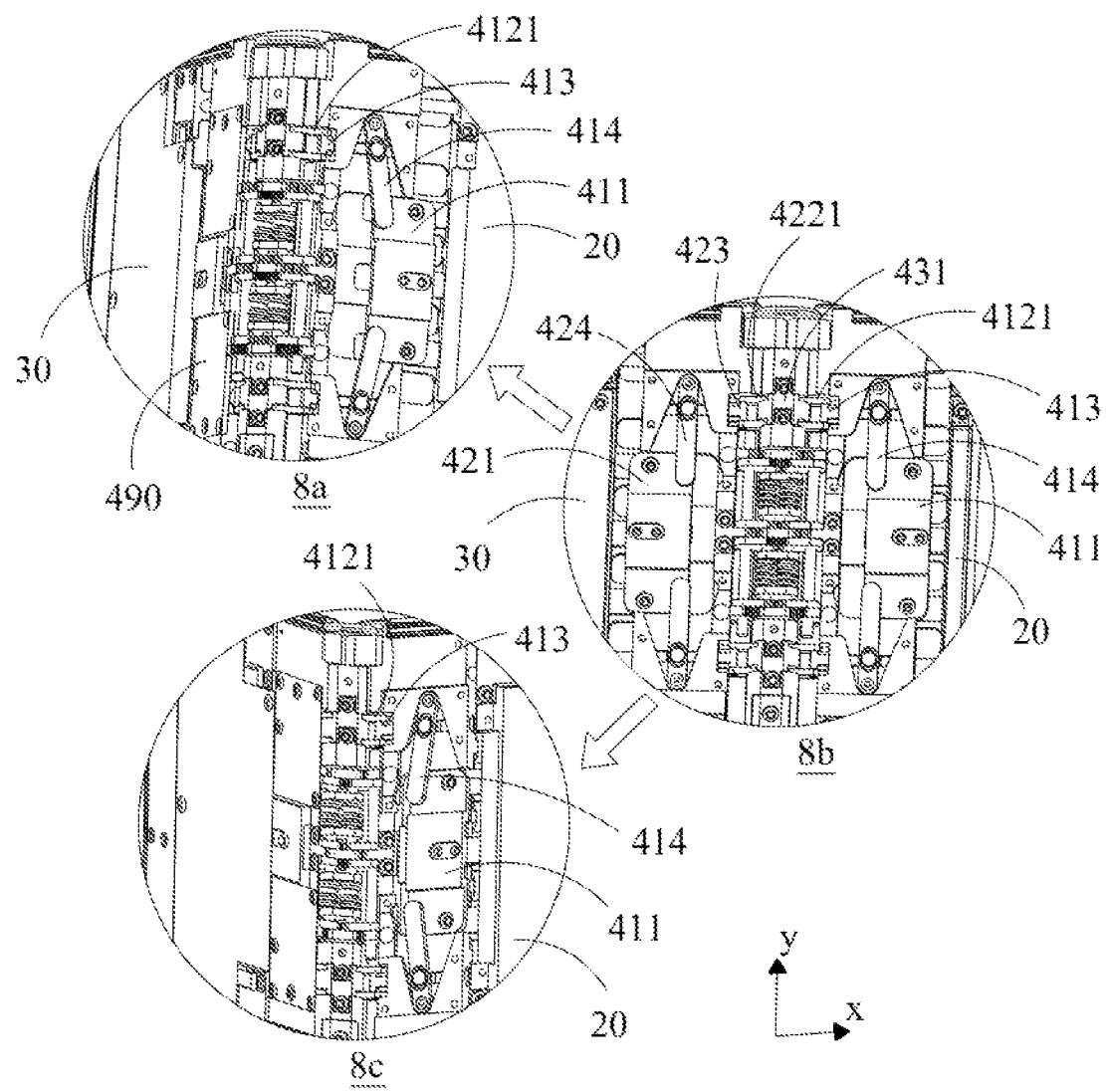
FIG. 8 is a schematic diagram of a folding process inside the back of a flexible display panel provided by the embodiments of the present application.

As shown in FIG. 6 and FIG. 8 in combination, FIG. 8 is a schematic diagram of a folding process inside the back of a flexible display panel provided by the embodiments of the present application. Wherein, when the flexible display panel shown in 8b to 8a is folded from the flattened state to the first fully folded state, the first movement mechanism 41 can rotate around the first axis L1, the first connecting rod 4121 can rotate around the first axis L1, and drive the first slider 413 can slide in the direction perpendicular to the second direction y, and gradually move away from the first fixing bracket 431. The first slider 413 drives the first swing rod 414 to swing through the first fixing member 415, and drives the first support part 20 through the first swing rod 414 to slide along with the first sliding plate 411 in a direction perpendicular to the second direction y, and gradually move away from the first fixing bracket 431.

In a process that the flexible display panel shown in 8b to 8a is folded from the flattened state to the first fully folded state, the second movement mechanism 42 can rotate toward to first movement mechanism 41 around the second axis L2, the second connecting rod 4221 rotates around the second axis L2 and drives the second slider 423 to slide in a direction perpendicular to the second direction y, and gradually moves away from the first fixing bracket 431. The second slider 423 drives second swing rod 424 to swing through the second fixing member 425 and drives the second support part 30 to slide along with the second sliding plate 421 in the direction perpendicular to the second direction y through the second swing rod 424, and gradually move away from the first fixing bracket 431.

In the process of folding the flexible display panel shown in 9b to 9a from the flattened state to the first fully folded state, the first supporting bars 21 gradually break away from seventh sliding grooves 464, the second supporting bars 31 gradually break away from eighth sliding grooves 474, both the first support part 20 and the second support part 30 gradually break away from the first fixing bracket 431, so that an accommodating space for receiving the flexible part 11 of the main body portion of the flexible display panel 10 is freed up, avoiding the first support part 20 and the second support part 30 from squeezing the flexible part 11 of the main body portion of the flexible display panel 10.

In a process that the flexible display panel shown in 8b to 8c is folded from the flat state to the second fully folded state, the first movement mechanism 41 can rotate around the first axis L1, the first connecting rod 4121 rotates around the first axis L1, and drives the first slider 413 to slide in a direction perpendicular to the second direction y, and gradually move close to the first fixing bracket 431. The first slider 413 drives the first swing rod 414 to swing through the first fixing member 415 and drives the first support part 20 to slide along with the first sliding plate 411 in the direction perpendicular to the second direction y through the first swing rod 414, and move gradually close to the first fixing bracket 43.

In the process that the flexible display panel shown in 8b to 8c is folded from the flat state to the second fully folded state, the second movement mechanism 42 can rotate opposite to the first movement mechanism 41 around the second axis L2, the second connecting rod 4221 rotates around the second axis L2 and drives the second slider 423 to slide in the direction perpendicular to the second direction y, and move gradually close to the fixing bracket 43. The second slider 423 drives the second swing rod 424 to swing through the second fixing member 425 and drives the second support part 30 to slide along with the second sliding plate 421 in the direction perpendicular to the second direction y through the second swing rod 424, and gradually move close to the fixing bracket 43.

In the process of folding the flexible display panel shown in 9b to 9c from the flattened state to the second fully folded state, the first supporting bars 21 are gradually received in the seventh sliding grooves 464, the second supporting bars 31 are gradually received in the eighth sliding grooves 474, both the first support part 20 and the second support part 30 are gradually close to the fixing bracket 431.

In the embodiments of this application, a curvature radius of the flexible part 11 in the first bending state is smaller than a curvature radius of the flexible part 11 in the second bending state. In the process that the flexible display panel is folded from the flat state to the second fully folded state, both the first support part 20 and the second support part 30 are close to the fixing bracket 43. Since the first part 12 and the second part 13 of the main body portion of the flexible display panel 10 are fixedly connected to the first support part 20 and the second support part 30, respectively, in a process that the first support part 20 and second support part 30 approach the fixing bracket 43, tensile stress of the first part 12 and the second part 13 to the flexible part 11 gradually decreases, so that the flexible part 11 is sufficiently deformed to adapt to an increased curvature radius under the second bending state to match the size of the main body portion of the flexible display panel 10 with the size of the hinge, avoiding the hinge from pulling the main body portion of the flexible display panel 10 during an outward folding process.

Figure 10:
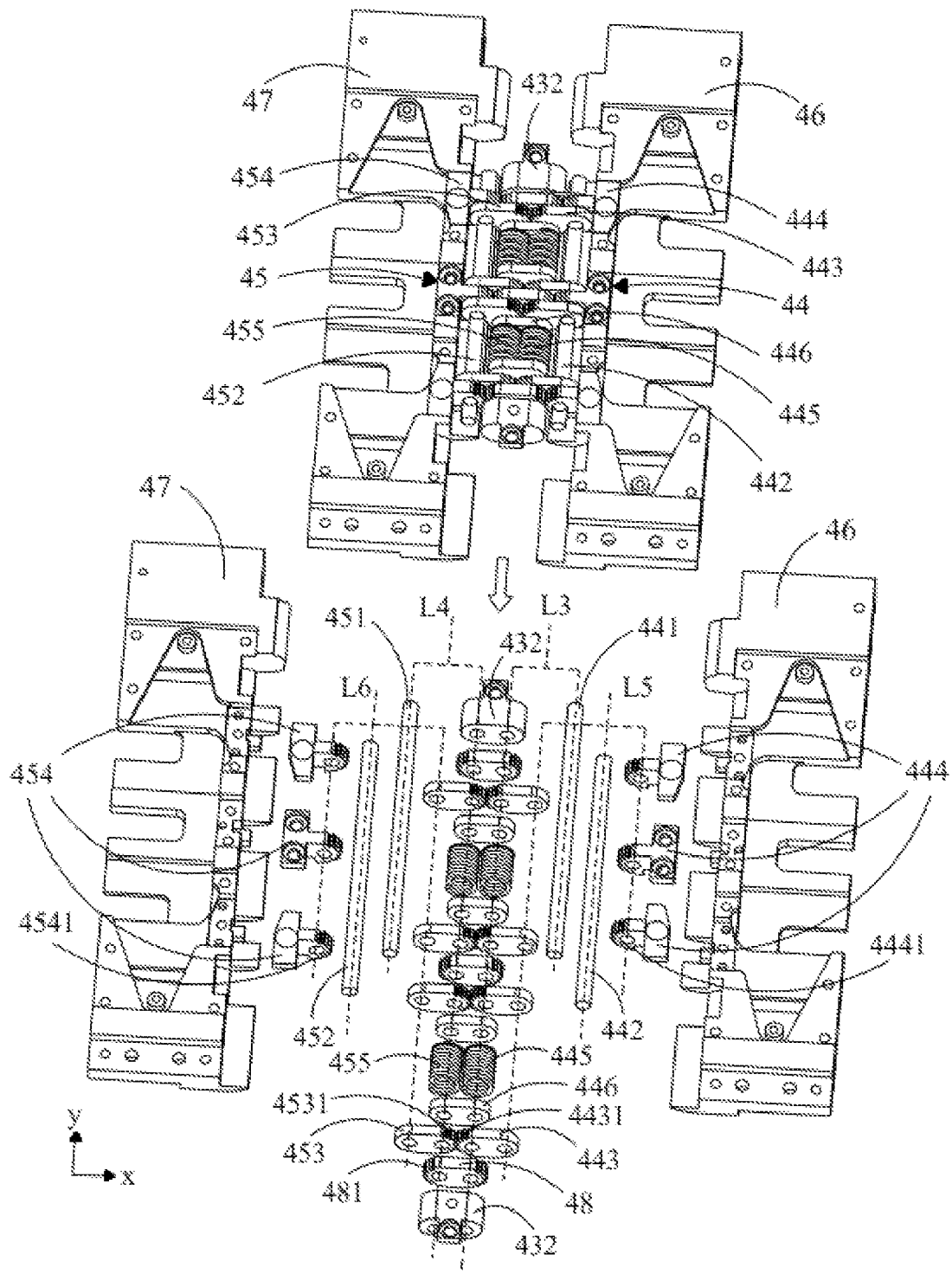
FIG. 10 is an exploded schematic diagram of a first rotating mechanism and a second rotating mechanism provided by the embodiments of the present application.

Furthermore, as shown in FIG. 10, FIG. 10 is an exploded schematic diagram of a first rotating mechanism and a second rotating mechanism provided by the embodiments of the present application, the first rotating mechanism 44 comprises a first rotating member 441, a second rotating member 442, a third transmission member 443, and a first linkage fixing member 444, the second rotating mechanism 45 comprises a third rotating member 451, a fourth rotating member 452, a fourth transmission member 453, and a second linkage fixing member 454, the fixing bracket 43 comprises a second fixing bracket 432, the second fixing bracket 432 fixedly connected to the first fixing bracket 431 through a screw connection.

The first rotating member 441 is rotatably connected to the second fixing bracket 432 along the third axis L3, the third transmission member 443 is sleeved on first rotating member 441, the second rotating member 442 is rotatably connected to the third transmission member 443 along the fifth axis L5, the first linkage fixing member 444 is sleeved on the second rotating member 442 and fixed connected to the first supporting plate 46.

The third rotating member 451 is rotatably connected to the second fixing bracket 432 along the fourth axis L4, the fourth transmission member 453 is sleeved on third rotating member 451, the fourth rotating member 452 is rotatably connected to the fourth transmission member 453 along the sixth axis L6, the second linkage fixing member 454 is sleeved on the second linkage fixing member 452 and fixed connected to the second supporting plate 47.

The third axis L3 and the fourth axis L4 are both parallel to the second direction y and spaced apart in the first direction x, and the fifth axis L5 and the sixth axis L6 are both parallel to the second direction y and spaced apart in the first direction x.

In the embodiment of the present application, the first rotating member 441, the second rotating member 442, the third rotating member 451, and the fourth rotating member 452 are all rotating shafts.

Two shaft holes are defined at opposite ends of the second fixing bracket 432, and the first rotating member 441 passes through one of the shaft holes of the second fixing bracket 432 along the third axis L3 and is rotatable relative to the second fixing bracket 432. The third rotating member 451 passes through another shaft hole of the second fixing bracket 432 along the fourth axis L4 and is rotatable relative to the second fixing bracket 432.

The third transmission member 443 is provided with the first gear part 4431, the fourth transmission member 453 is provided with the second gear part 4531. The first gear part 4431 is provided with a shaft hole, and the first rotating member 441 passes through the shaft hole on the first gear part 4431 and can rotate relative to the first gear part 4431. The second gear part 4531 is also provided with a shaft hole, and the third rotating member 451 passes through the shaft hole on the second gear part 4531 and can rotate relative to the second gear part 4531. Both the first gear part 4431 and the second gear part 4531 are provided with serrations, and the first gear part 4431 meshes with the second gear part 4531, so that the first rotating mechanism 44 and the second rotating mechanism 45 can realize bilateral synchronous rotation.

One end of the third transmission member 443 far away from the first gear part 4431 is also provided with a shaft hole, the second rotating member 442 passes through the shaft hole and can rotate relative to the third transmission member 443. One end of the fourth transmission member 453 far away from the second gear part 4531 is also provided with a shaft hole, the fourth rotating member 452 passes through the shaft hole and can rotate relative to the fourth transmission member 453.

Both the first hinge 40a and the second hinge 40b also comprise a plurality of fixed blocks 48, opposite ends of the fixed block 48 are provided with shaft holes, the first rotating member 441 and the third rotating member 451 pass through the shaft holes on the fixed block 48 respectively, and can rotate relative to the fixed block 48.

An opposite side of the fixed block 48 is provided with a rack 481, the first linkage fixing member 444 is provided with a third gear part 4441, the third gear part 4441 is provided with a shaft hole, the second rotating member 442 passes through the shaft hole and can rotate relative to the first linkage fixing member 444.

The second linkage fixing member 454 is provided with a fourth gear part 4541, the fourth gear part 4541 is also provided with a shaft hole, the fourth rotating member 452 passes through the shaft hole and can rotate relative to the fourth gear part 4541.

Both the third gear part 4441 and the fourth gear part 4541 are provided with serrations, the third gear part 4441 and the fourth gear part 4541 mesh with the rack 481 of the fixed block 48 respectively, so that to ensure that the first supporting plate 46 and the second supporting plate 47 can achieve bilateral synchronous rotation. And when the flexible display panel is folded inward, they form certain inclination with the first support part 20 and the second support part 30 respectively, on this account to form the flexible display panel into wedge-shaped or U-shaped, and to reduce bending stress received by the flexible part 11, meanwhile, it can also avoid unsynchronized rotation of the first supporting plate 46 and the second supporting plate 47, which may cause the flexible part 11 to be squeezed.

Both the first hinge 40a and the second hinge 40b comprises a plurality of limiting members 446, a first elastic member 445, and a second elastic member 455. The first elastic member 445 is sleeved on the first rotating member 441, the second elastic member 455 is sleeved on the third rotating member 451. Opposite ends of the limiting member 446 are provided with shaft holes, the first rotating member 441 and the third rotating member 451 pass through the shaft holes respectively. Both the first elastic member 445 and the second elastic member 455 are clamped between two limiting members, the first elastic member 445 and the second elastic member 455 are both springs.

As shown in FIG. 6, in the embodiment of the present application, both the first hinge 40a and the second hinge 40b also include a first guide rod connector 491, a second guide rod connector 492, a first guide rod 493, and a second guide rod 494, the first supporting plate 46 is provided with a first sliding hole, the second supporting plate 47 is provided with a second sliding hole, the first guide rod connector 491 is fixedly connected to the first support part 20, one end of the first guide rod 493 is connected to the first guide rod connector 491, another end of the first guide rod 493 is slidably installed in the first sliding hole.

The second guide rod connector 492 is fixedly connected to the second support part 30, one end of the second guide rod 494 is connected to the second guide rod connector 492, another end of the second guide rod 494 is slidably installed in the second sliding hole.

In the embodiment of the present application, as shown in FIG. 8, both the first hinge 40a and the second hinge 40b further comprise a plurality of auxiliary support plates 490, Some auxiliary supporting plates 490 can be fixedly connected to the first supporting plate 46 and cover the first slider 413, the first swing rod 414, and part of the first sliding plate 411. Some other auxiliary support plates 490 can also be fixedly connected to the second supporting plate 47, and cover the second slider 423, the second swing rod 424, and part of the second sliding plate 421, which can not only improve flatness of the back of the flexible display panel, but also can be used to protect and press the first slider 413, the first swing rod 414, and other above-mentioned components to prevent the above-mentioned components from falling off in a process of folding or unfolding movements.

In the embodiment of the present application, as shown in FIG. 1 and FIG. 2, the flexible display panel 100 may also include a bottom shield member 90. There are hard materials on both sides and a middle of the bottom shield 90, and other parts are made of soft materials with a certain elastic deformation ability. The parts formed by hard materials on both sides of the bottom shield 90 can be fixedly connected to the back of the first supporting plate 46 and the second supporting plate 47 respectively by means of screwing, and can fold or unfold with the first supporting plate 46 and the second supporting plate 47. The hard material in the middle of the bottom shield 90 can be fixedly connected to the back of the fixing bracket 43 by means of glue or the like. The first back shell 70, the second back shell 80, and the bottom shield 90 form a component together that shields the back of the electronic device. The first back shell 70 and the second back shell 80 can shield the two ends of the bottom shield 90 respectively. When the flexible display panel is folded inwards or outwards, the bottom shield 90 can slide relative to the first rear shell 70 and the second rear shell 80.

In the embodiment of the present application, as shown in FIG. 1, the flexible display panel 100 further comprises a stylus 91, the stylus 91 can perform a click touch on the main body portion of the flexible display panel 10. The first support part 20 is provided with a pen slot 22, when the stylus 91 is not in use, the stylus 91 can be accommodated in the pen slot 22. When the stylus 91 needs to be used, the stylus 91 can be taken out from the pen slot 22.

Beneficial effects of the embodiments of this application: the embodiments of the present application provide a flexible display panel and an electronic device, the electronic device comprises the flexible display panel, the flexible display panel comprises a main body of the flexible display panel, a first support part, a second support part, and a hinge, the main body of the flexible display panel comprises a flexible part, the hinge comprises a fixing bracket, a first movement mechanism, and a second movement mechanism, the first movement mechanism is rotatably connected to the fixing bracket along a first axis, the first movement mechanism is fixed connected to the first support part to drive the first support part to move away from or close to the fixing bracket, the second movement mechanism is rotatably connected to the fixing bracket along a second axis, the second movement mechanism is fixed connected to the second support part to drive the second support part to move away from or close to the fixing bracket, when the flexible part is in a bending state, the first support part and the second support part are both away from or close to the fixing bracket, in this way, a size of the flexible part is matched with a size of the hinge, thereby avoiding the hinge from squeezing or pulling the main body of the flexible display panel.

In summary, although the preferred embodiments of this application are disclosed as above, the above preferred embodiments are not intended to limit the application. Those of ordinary skill in the art can make various kinds of work without departing from the spirit and scope of the application. Changes and modifications, so the scope of protection of this application is based on the scope defined by the claims.

What is claimed is:

1. A flexible display panel, comprising:
a main body of the flexible display panel, comprising a flexible part;
a first support part;
a second support part; and
a hinge, comprising:
a fixing bracket;
a first movement mechanism rotatably connected to the fixing bracket along a first axis, the first movement mechanism connected to the first support to drive the first support to move away from or close to the fixing bracket; and
a second movement mechanism rotatably connected to the fixing bracket along a second axis, the second movement mechanism connected to the second support to drive the second support to move away from or close to the fixing bracket;
wherein when the flexible part is in a bending state, the first support and the second support are both away from or close to the fixing bracket.

2. The flexible display panel according to claim 1, wherein the bending state comprises a first bending state and a second bending state;
wherein when the flexible part is in the first bending state, the first support and the second support are both away from the fixing bracket; when the flexible part is in the second bending state, the first support and the second support are close to the fixing bracket;
a radius of curvature of the flexible part in the first bending state is smaller than a radius of curvature of the flexible part in the second bending state.

3. The flexible display panel according to claim 1, wherein the first movement mechanism comprises a first transmission mechanism and a first sliding plate, the second movement mechanism comprises a second transmission mechanism and a second sliding plate;
wherein the first transmission mechanism is rotatably connected to the fixing bracket along the first axis, the first transmission mechanism is movably connected to the first sliding plate to drive the first sliding plate away from or close to the fixing bracket, the first sliding plate is fixedly connected to the first support;
the second transmission mechanism is rotatably connected to the fixing bracket along the second axis, the second transmission mechanism is movably connected to the second sliding plate to drive the second sliding plate away from or close to the fixing bracket, and the second sliding plate is fixedly connected to the second support.

4. A flexible display panel, comprising:
a main body of the flexible display panel, comprising a flexible part;
a first support part;
a second support part; and
a hinge, comprising:
a fixing bracket;
a first movement mechanism rotatably connected to the fixing bracket along a first axis, the first movement mechanism connected to the first support to drive the first support to move away from or close to the fixing bracket; and
a second movement mechanism rotatably connected to the fixing bracket along a second axis, the second movement mechanism connected to the second support to drive the second support to move away from or close to the fixing bracket;
wherein when the flexible part is in a bending state, the first support and the second support are both away from or close to the fixing bracket;
wherein the first movement mechanism comprises a first transmission mechanism and a first sliding plate, the second movement mechanism comprises a second transmission mechanism and a second sliding plate;
wherein the first transmission mechanism is rotatably connected to the fixing bracket along the first axis, the first transmission mechanism is movably connected to the first sliding plate to drive the first sliding plate away from or close to the fixing bracket, the first sliding plate is fixedly connected to the first support;
the second transmission mechanism is rotatably connected to the fixing bracket along the second axis, the second transmission mechanism is movably connected to the second sliding plate to drive the second sliding plate away from or close to the fixing bracket, and the second sliding plate is fixedly connected to the second support; wherein the hinge further comprises:
a first rotating mechanism rotatably connected to the fixing bracket along a third axis;
a second rotating mechanism rotatably connected to the fixing bracket along a fourth axis;
a first supporting plate rotatably connected to the first rotating mechanism along a fifth axis, the first sliding plate slidably mounted on the first supporting plate; and
a second supporting plate rotatably connected to the second rotating mechanism along a sixth axis, and the second sliding plate slidably mounted on the second supporting plate.

5. The flexible display panel according to claim 4, wherein the first transmission mechanism comprises a first transmission part, a first slider, and a first swing rod; the second transmission mechanism comprises a second transmission part, a second slider, and a second swing rod;
wherein the first transmission part is rotatably connected to the fixing bracket along the first axis, the first transmission part is rotatably connected to one end of the first slider, another end of the first slider is movably connected to the first swing rod, one end of the first swing rod is rotatably connected to the first supporting plate, another end of the first swing rod is movably connected to the first slider;
the second transmission part is rotatably connected to the fixing bracket along the second axis, the second transmission part is rotatably connected to one end of the second slider, another end of the second slider is movably connected to the second swing rod, one end of the second swing rod is rotatably connected to the second supporting plate, and another end of the second swing rod is movably connected to the second slider.

6. The flexible display panel according to claim 5, wherein the first transmission part comprises a first connecting rod, and the second transmission part comprises a second connecting rod;
wherein one end of the first connecting rod is rotatably connected to the fixing bracket, another end of the first connecting rod is rotatably connected to the first slider;

one end of the second connecting rod is rotatably connected to the fixing bracket, and another end of the second connecting rod is rotatably connected to the second slider.

7. The flexible display panel according to claim 5, wherein the first supporting plate is provided with a first sliding groove, and the second supporting plate is provided with a second sliding groove;
wherein the first slider is slidably received in the first sliding groove, and the second slider is slidably received in the second sliding groove.

8. The flexible display panel according to claim 7, wherein the first transmission mechanism further comprises a first fixing member, the second transmission mechanism further comprises a second fixing member; the first swing rod is provided with a third sliding groove, and the second swing rod is provided with a fourth sliding groove; the first fixing member passes through the third sliding groove and is fixedly connected to the first slider, and the second fixing member passes through the fourth sliding groove and is fixedly connected to the second slider.

9. The flexible display panel according to claim 8, wherein the first transmission mechanism further comprises a third fixing member, the second transmission mechanism further comprises a fourth fixing member; the first sliding plate is provided with a fifth sliding groove, the second sliding plate is provided with a sixth sliding groove; the third fixing member passes through the fifth sliding groove and is fixedly connected to the first swing rod, and the fourth fixing member passes through the sixth sliding groove and is fixedly connected to the second swing rod.

10. The flexible display panel according to claim 4, wherein the first rotating mechanism comprises a first rotating member, a second rotating member, a third transmission member, and a first linkage fixing member; the second rotating mechanism comprises a third rotating member, a fourth rotating member, a fourth transmission member, and a second linkage fixing member;
wherein the first rotating member is rotatably connected to the fixing bracket along the third axis, the third transmission member is sleeved on the first rotating member, the second rotating member is rotatably connected to the third transmission member along the fifth axis; one end of the first linkage fixing member is sleeved on the second rotating member, and another end of the first linkage fixing member is fixedly connected to the first supporting plate;
the third rotating member is rotatably connected to the fixing bracket along the fourth axis, the fourth transmission member is sleeved on the third rotating member, the fourth rotating member is rotatably connected to the fourth transmission member along the sixth axis; one end of the second linkage fixing member is sleeved on the fourth rotating member, and another end of the second linkage fixing member is fixedly connected to the second supporting plate.

11. The flexible display panel according to claim 10, wherein the third transmission member has a first gear part, and the fourth transmission member has a second gear part;
wherein the first gear part meshes with the second gear part.

12. The flexible display panel according to claim 11, wherein the hinge further comprises a fixed block, the first rotating part and the third rotating part are rotatably connected to the fixed block;
wherein opposite sides of the fixed block are provided with racks; the first linkage fixing member has a third gear part, the second linkage fixing member is provided with a fourth gear portion, and the third gear part and the fourth gear part meshes with the racks, respectively.

13. The flexible display panel according to claim 4, wherein the hinge further comprises a first guide rod connector, a second guide rod connector, a first guide rod, and a second guide rod; the first support plate is provided with a first sliding hole, the second support plate is provided with a second sliding hole;
wherein the first guide rod connector is fixedly connected to the first support; one end of the first guide rod is fixedly connected to the first guide rod connector, another end of the first guide rod can be slidably installed in the first sliding hole;
the second guide rod connector is fixedly connected to the second support; one end of the second guide rod is fixedly connected to the second guide rod connector, and another end of the second guide rod is slidable installed in the second sliding hole.

14. The flexible display panel according to claim 4, wherein the first supporting member has a plurality of first supporting bars arranged at intervals, the second supporting member has a plurality of second supporting bars arranged at intervals; and the first supporting plate is provided with a plurality of seventh sliding grooves arranged at intervals, the second support plate has a plurality of eighth sliding grooves arranged at intervals;
wherein the first supporting bars are slidably received in the seventh sliding grooves, and the second supporting bars are slidably received in the eighth sliding grooves.

15. An electronic device, comprising a flexible display panel, the flexible display panel comprising:
a main body of the flexible display panel, comprising a flexible part;
a first support part;
a second support part; and
a hinge, comprising:
a fixing bracket;
a first movement mechanism rotatably connected to the fixing bracket along a first axis, the first movement mechanism connected to the first support to drive the first support to move away from or close to the fixing bracket; and
a second movement mechanism rotatably connected to the fixing bracket along a second axis, the second movement mechanism connected to the second support to drive the second support to move away from or close to the fixing bracket;
wherein, when the flexible part is in a bending state, the first support and the second support are both away from or close to the fixing bracket.

16. The electronic device according to claim 15, wherein the bending state comprises a first bending state and a second bending state;
wherein, when the flexible part is in the first bending state, the first support and the second support are both away from the fixing bracket; when the flexible part is in the second bending state, the first support and the second support are close to the fixing bracket;
a radius of curvature of the flexible part in the first bending state is smaller than a radius of curvature of the flexible part in the second bending state.

17. The electronic device according to claim 15, wherein the first movement mechanism comprises a first transmission mechanism and a first sliding plate, the second movement mechanism comprises a second transmission mechanism and a second sliding plate;

wherein, the first transmission mechanism is rotatably connected to the fixing bracket along the first axis, the first transmission mechanism is movably connected to the first sliding plate to drive the first sliding plate away from or close to the fixing bracket, the first sliding plate is fixedly connected to the first support;

the second transmission mechanism is rotatably connected to the fixing bracket along the second axis, the second transmission mechanism is movably connected to the second sliding plate to drive the second sliding plate away from or close to the fixing bracket, and the second sliding plate is fixedly connected to the second support.

18. The electronic device according to claim 17, wherein the hinge further comprises:
   a first rotating mechanism, rotatably connected to the fixing bracket along a third axis;
   a second rotating mechanism, rotatably connected to the fixing bracket along a fourth axis;
   a first supporting plate, rotatably connected to the first rotating mechanism along a fifth axis, the first sliding plate slidably mounted on the first supporting plate; and
   a second supporting plate, rotatably connected to the second rotating mechanism along a sixth axis, and the second sliding plate slidably mounted on the second supporting plate.

19. The electronic device according to claim 18, wherein the first transmission mechanism comprises a first transmission part, a first slider, and a first swing rod; the second transmission mechanism comprises a second transmission part, a second slider and a second swing rod;
   wherein, the first transmission part is rotatably connected to the fixing bracket along the first axis, the first transmission part is rotatably connected to one end of the first slider, another end of the first slider is movably connected to the first swing rod, one end of the first swing rod is rotatably connected to the first supporting plate, another end of the first swing rod is movably connected to the first slider;
   the second transmission part is rotatably connected to the fixing bracket along the second axis, the second transmission part is rotatably connected to one end of the second slider, another end of the second slider is movably connected to the second swing rod, one end of the second swing rod is rotatably connected to the second supporting plate, and another end of the second swing rod is movably connected to the second slider.

20. The electronic device according to claim 19, wherein the first transmission part comprises a first connecting rod, and the second transmission part comprises a second connecting rod;
   wherein, one end of the first connecting rod is rotatably connected to the fixing bracket, another end of the first connecting rod is rotatably connected to the first slider; one end of the second connecting rod is rotatably connected to the fixing bracket, and another end of the second connecting rod is rotatably connected to the second slider.

* * * * *